(12) United States Patent
Predovic et al.

(10) Patent No.: US 10,832,167 B2
(45) Date of Patent: Nov. 10, 2020

(54) INTEREST PREDICTION FOR UNRESOLVED USERS IN AN ONLINE SYSTEM

(71) Applicant: Facebook, Inc., Menlo Park, CA (US)

(72) Inventors: Goran Predovic, Redmond, WA (US); Chaochao Cai, Bellevue, WA (US)

(73) Assignee: Facebook, Inc., Menlo Park, CA (US)

( * ) Notice: Subject to any disclaimer, the term of this patent is extended or adjusted under 35 U.S.C. 154(b) by 866 days.

(21) Appl. No.: 15/397,530

(22) Filed: Jan. 3, 2017

(65) Prior Publication Data
US 2018/0189676 A1 Jul. 5, 2018

(51) Int. Cl.
| | | |
|---|---|---|
| *G06K 9/62* | (2006.01) | |
| *G06Q 30/02* | (2012.01) | |
| *G06K 9/00* | (2006.01) | |
| *H04N 21/25* | (2011.01) | |
| *G06F 17/00* | (2019.01) | |
| *G06N 20/00* | (2019.01) | |
| *G06Q 50/00* | (2012.01) | |
| *G06Q 10/10* | (2012.01) | |
| *G06F 16/00* | (2019.01) | |
| *G06F 16/9535* | (2019.01) | |

(52) U.S. Cl.
CPC ............ *G06N 20/00* (2019.01); *G06F 16/00* (2019.01); *G06F 16/9535* (2019.01); *G06Q 10/10* (2013.01); *G06Q 30/0241* (2013.01); *G06Q 30/0251* (2013.01); *G06Q 30/0269* (2013.01); *G06Q 50/01* (2013.01)

(58) Field of Classification Search
CPC ..... G06N 20/00; G06F 16/9535; G06F 16/00; G06Q 10/10; G06Q 30/0241; G06Q 30/0251; G06Q 30/0269; G06Q 50/01
USPC ...................................................... 706/1–62
See application file for complete search history.

(56) References Cited

U.S. PATENT DOCUMENTS

| | | | |
|---|---|---|---|
| 2012/0209795 A1* | 8/2012 | Glickman .......... | G06Q 30/0201 706/12 |
| 2012/0291022 A1* | 11/2012 | Mehta ....................... | G06F 8/60 717/176 |
| 2017/0258383 A1* | 9/2017 | Dagum .................. | A61B 5/163 |

\* cited by examiner

*Primary Examiner* — Brandon S Cole
(74) *Attorney, Agent, or Firm* — Fenwick & West LLP

(57) ABSTRACT

Disclosed is an online system that infers interests of unresolved users for whom the interests are not known. The online system determines certain features about the unresolved users, but does not have certain information about the users themselves (e.g., their interests), so instead infers these attributes based on the features of the user. The online system provides the features as input to a classifier trained to predict a particular interest, and the classifier outputs a prediction of whether the user has the corresponding interest. In one embodiment, the online system trains a classifier for various interest values by forming training sets for the interests using the features for users who are logged into the online system and hence have known interests.

15 Claims, 5 Drawing Sheets

INTEREST PREDICTION FOR UNRESOLVED USERS IN AN ONLINE SYSTEM

FIELD OF ART

The present disclosure generally relates to the field of machine learning for making predictions about user, and more specifically, to predicting attributes of unresolved users of an online system for whom limited information is otherwise available.

BACKGROUND

Online systems, such as social networking systems, often need to choose content to be distributed to users. This becomes more difficult when characteristics of the users are unknown to the online systems, since the online systems will then have little or no information on which to draw when identifying the more appropriate content for the users. Unfortunately, this is often the case for many users, such as when those users are not presently logged into the online systems, or do not have accounts on the online systems at all. Accordingly, in such situations, the online systems are unable to determine the most appropriate content to distribute to such "unresolved" users, possibly resulting in those users being included in audiences for content that is not as relevant to those users due to this lack of data about the users' interests and demographic profiles.

SUMMARY

An online system uses machine-learning based prediction of attributes of "unresolved" users of the online system to determine the most appropriate content to distribute to such "unresolved" users. An "unresolved" user for an online system is a user that the online system cannot at that moment associate with an account on the online system (e.g., the user is not logged in, or possibly does not have account at all). When a user is unresolved, the online system has limited information so it is difficult to determine in which audiences for content the user should be included by the online system. As one example, a content provider might define an audience for the content provider's content as all females between 18-20. But if a new user becomes available to receive content at a site or application outside of the online system while the user is not logged into the online system, the online system may not have enough data about the user's interests to determine if the user meets the defined audience for the content.

The online system predicts the interests of "unresolved" users of an online system in a series of steps based on information available about those users. The online system receives from content providers a set of content items associated with an audience defining interests of users to whom the content items are to be presented.

In a first embodiment using averaged feature sets, in order to form a model for predicting a given interest (e.g., whether the user has an interest in football), the online system forms a training set of users known to have the interest (e.g., some or all users whose profiles on the online system indicate that they are interested in football). For each user in the training set, the online system derives a set of features corresponding to a set of variables selected to be predictive of user interests. For example, in one embodiment, the set of features is a feature vector, each entry of which represents to whether the user has installed a corresponding application (e.g., the first entry represents whether the user has installed a first particular game application, the second entry represents whether the user has installed a second particular chat application, etc.). The online system generates an averaged feature set corresponding to the training set/given interest that averages the corresponding values of the features for the different users in the training set. For an unresolved user, the online system derives the same set of features for the unresolved user as were derived for generating the average feature set and computes a degree of similarity between the feature set for the unresolved user and the averaged feature set. The degree of similarity represents the likelihood that the unresolved user has the given interest.

In a second embodiment using supervised machine learning, the online system derives features of an unresolved user, such as a user for whom a value of one or more interests is not known because the user is not logged in to the online system, or for other reasons. For example, the interests may include an interest in listening to music, an interest in football, etc. For each of the interests, the online system forms a training set of users corresponding to the interest. The online system trains a classifier for each interest to predict the interest for a user based on features of users of the training set as input to a machine learning algorithm. When the online system detects an opportunity to provide one of the received content items to an unresolved user who the online system is unable to match to a user account on the online system, the online system applies one or more of the trained classifiers to predict one or more interests for the unresolved user. In a first example, the online system derives features related to a set of interests of the unresolved user. In a second example, the online system derives features from the client device of the unresolved user. In a third example, the online system derives features about a set of unidirectional connections in a social graph maintained in a web-based server. The online system provides the features as input to one of the trained classifiers derived from machine learning. The online system obtains as an output from the trained classifier a prediction of a value for at least one of the interests of the unresolved user (e.g., that the user is interested in football). The online system selects content to provide for display to the unresolved user based on the predicted interests of the unresolved user.

In one example of the second embodiment, the online system derives a set of features of a training set of users visiting the online system. The users of the training set are not unresolved, but rather are known to the online system, and hence any information about their interests stored by the online system can be used to form training sets. For example, the training set for an interest in football is made up of users who are known to have an interest in football (e.g., due to those users having explicitly listed an interest in football in their profiles, or the online system inferring an interest in football based on their actions on the online system, such as viewing and liking pages dedicated to football). The set of features of users of the training set may include: indications of whether given software applications are installed on a mobile phone (e.g., a first feature indicating whether a first given application is installed on the client device, a second feature indicating whether a second given application is installed, etc.), information related to the software applications that are installed on the client device (e.g. genre, developer's name, free vs. paid), the time of usage of a software application that is installed, the number and type of software applications used, the type of certain application installed (e.g., type of gaming application), the type of operating system used in the client device, the type of mobile phone representing the client device, any information available regarding the type of user related to the client device, or any combination thereof.

The online system trains a classifier to determine values of the interest (e.g. interest in music) for users based on the user profiles on the online system. The online system forms a training set of the known users for the interest based on the determined values (e.g., a "music" training set of users known based on their profiles to have the "rock music" value of the "music" interest). The online system trains a classifier for the interest by providing the features of known users of the training set as input to a supervised machine learning algorithm such that the algorithm learns what features are commonly associated with that interest (e.g., users with interests in music tend to have installed certain applications on their phones or other client devices).

When a user of the online system visits a website or a mobile application different from the online system at a time when the user is unresolved with respect to the online system, the user's identity (and therefore the user's profile) is not known to the online system, and it may not be possible for the online system to match the user to the user's profile or account on the online system. Accordingly, the online system applies the trained classifier to predict whether the user has the interests corresponding to the classifier. To do so, the online system derives the same type of features derived as part of the training process (e.g., the set of applications that the user has installed on the user's client device). The online system provides the derived features as input to the trained classifier. The online system obtains as an output from the trained classifier a prediction for at least one of the interests of the unresolved user (e.g., a prediction that the user has an interest in football). The online system selects content to provide to the user based on the predicted interest (e.g., whether the user is interested in football) and provides the selected content to the user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
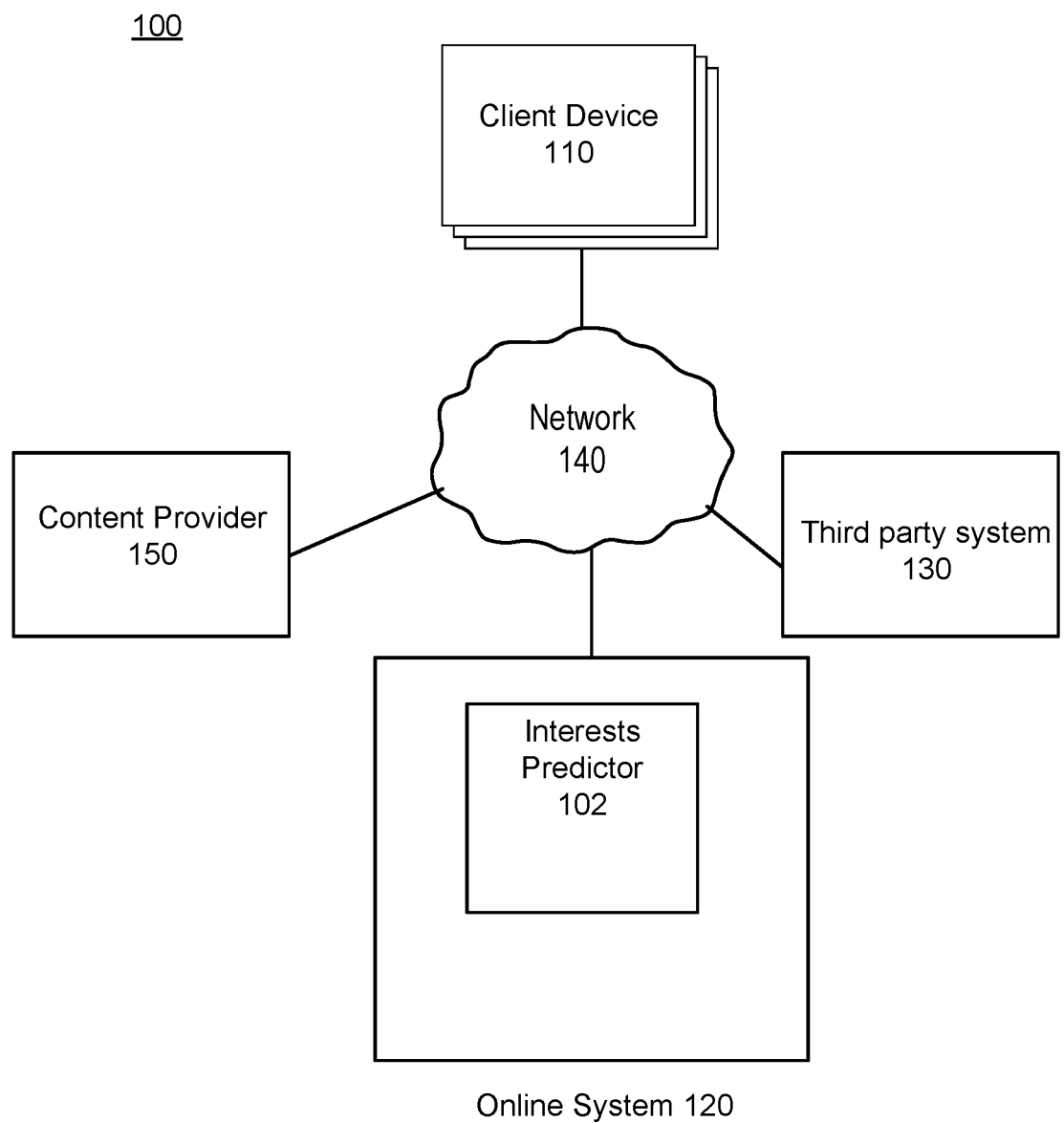
FIG. 1 illustrates a computing environment in which users use their client devices to interact with an online system and a content sharing system, such as to share some device level features through the network, according to one embodiment.

FIG. 1 illustrates a computing environment 100 in which users use the client devices 110 to interact with an online system 120 via a network 140, according to one embodiment. In alternative configurations, different and/or additional components may be included in the computing environment 100. For example, the computing environment 100 may optionally include one or more third-party systems 130 and one or more content providers 150. The embodiments described herein can be adapted to online systems that are not social networking systems.

The client devices 110 are one or more computing devices capable of receiving user input as well as transmitting and/or receiving data via the network 140. The client devices 110 are configured to communicate via the network 140, which may comprise any combination of local area and/or wide area networks, using both wired and/or wireless communication systems.

The online system 120 represents a system that can communicate with the client devices 110 via the network 140. In some embodiments, the online system 120 may represent a social networking system including users with various interests. The online system 120 may distribute content items to the client devices 110 based on the targeting criteria for the users with specific interest, provided that those interests are known (or predicted). Examples of targeting criteria analyzed in different embodiments include age, gender, location, and income, and in some embodiments, may also include information about user interests, such as whether the user is interested in a particular sport, in video games, in travel, in gardening, in a particular movie, and the like. The content items distributed by the online system 120 may include, but are not restricted to, sponsored content items (e.g. advertisements).

However, in many cases, the interests of a user are not known to the online system 120, and such users are tagged as "unresolved" users, defined as a user with no or limited information about the user in the online system 120, since they have not been linked to an account with the online system 120 (e.g., are not logged in, or possibly do not have account at all).

To address this situation, the online system 120 comprises an interest predictor 102 that infers the interests of the users that have missing information about their interests. The interest predictor 102 can infer the interests based on device-level features received from the client devices 110, as described below with reference to FIG. 2.

One or more third party systems 130 may be coupled to the network 140 for communicating with the online system 120. In one embodiment, a third party system 130 is an application provider communicating information describing applications for execution by a client device 110 or communicating data to the client devices 110 for use by an application executing on the client device. In other embodiments, a third party system 130 provides content or other information for presentation via a client device 110. A third party system 130 may also communicate information to the online system 120, such as sponsored content items, content, or information about an application provided by the third party system 130.

The content provider 150 may be coupled to the network 140 for communicating with the online system 120. In one embodiment, the content provider 150 provides content items to share with the client device 110 through the online system 120. For example, the content provider 150 shares a promotional content item to the online system 120 and the online system 120 presents the promotional content item to an user associated with the client device 110.

FIG. 1 is only one example of the computing environment to share device level features through the network 140. In one embodiment, a client device 110 may be a device having computer functionality, such as a personal digital assistant (PDA), a mobile telephone, a smartphone or another suitable device. In one embodiment, the client devices 110 execute an application allowing a user of the client devices 110 to interact with the online system 120. For example, a client devices 110 execute a browser application to enable interaction between the client devices 110 and the online system 120 via the network 140. In another embodiment, a client devices 110 interact with the online system 120 through an application programming interface (API) running on a native operating system of the client devices 110, such as IOS® or ANDROID™. In alternate configurations, the computing environment may include multiple online systems 120, or the online system 120 may include additional, fewer, or different components for various applications. In one embodiment, the network 140 uses standard communications technologies and/or protocols. Data exchanged over the network 140 may be represented using any suitable format, such as hypertext markup language (HTML) or extensible markup language (XML). In some embodiments, all or some of the communication links of the network 140 may be encrypted using any suitable technique or techniques. Conventional components such as network interfaces, security functions, load balancers, failover servers, management and network operations consoles, and the like are not shown so as to not obscure the details of the computing environment.

Figure 2:
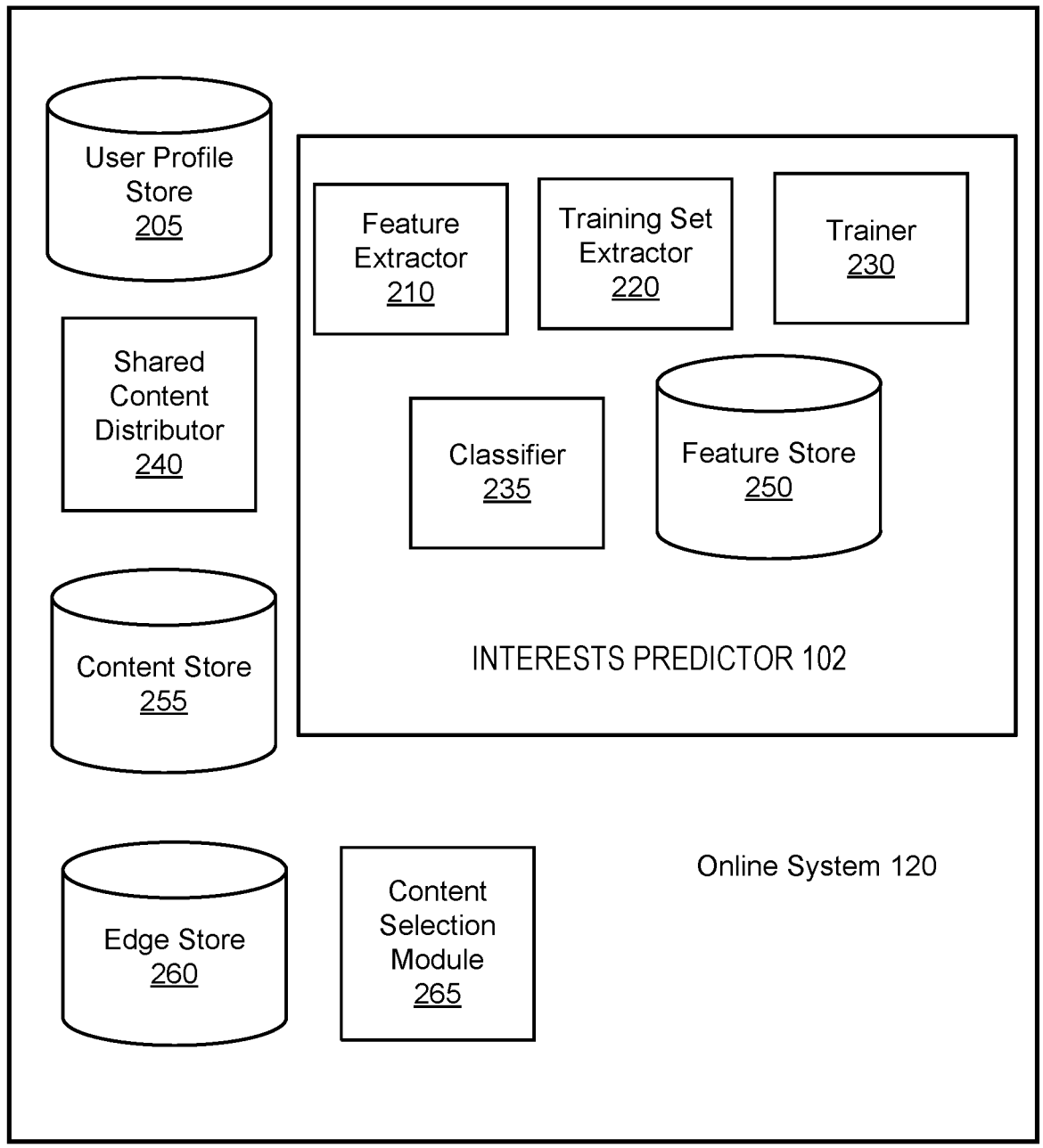
FIG. 2 is a high-level block diagram illustrating a detailed view of a predictor inferring interests of unresolved users, according to one embodiment.

FIG. 2 is a high-level block diagram illustrating a detailed view of the online system 120 for inferring interests of unresolved users, according to one embodiment. The online system 120 includes a user profile store 205, the interest predictor 102, a content distributor 245, a content store 255, an edge store 260, and a content selection module 265.

Each user of the online system 120 is associated with a user profile, which is stored in the user profile store 205. A user profile includes declarative information about the user that was explicitly shared by the user and may also include profile information inferred by the online system 120. In one embodiment, a user profile includes multiple data fields, each describing one or more attributes of the corresponding user of the online system 120. Examples of information stored in a user profile include biographic, demographic, and other types of descriptive information, such as work experience, educational history, gender, hobbies or preferences, location and the like. Examples of interests analyzed in different embodiments include information about user interests, such as whether the user is interested in video games, in travel, in gardening, in a particular movie, and the like.

The interests predictor 102 is a module of the online system 120 that can predict or infer the interests (e.g. music, sports, politics, movies, etc.) of an unresolved user. In embodiments that employ supervised machine learning, the interest predictor 102 includes a feature extractor 210, a training set extractor 220, a trainer 230, a classifier 235, and a feature store 250.

The feature extractor 210 is a module that extracts features associated with users that can be used for machine learning purposes. For example, in various embodiments the features include whether various software applications are installed on the client device (e.g., each such feature corresponding to a unique application, and whether that application is installed), the use of a software application that is installed (e.g., for each unique application, times that the application was executed or terminated and/or the amount of time between execution and termination, the times that the application was used for particular purposes, the times that the application used particular functionality of the client device (e.g., the network)), the number and type of software applications used (e.g., a count of the distinct applications and of the number of applications in different predefined categories, such as "utilities," "social networking", "multimedia", and the like), or any combination thereof. The features extracted by the feature extractor 210 may represent one or more variables with each variable having one or more values. For example, if the feature represents variables corresponding to installation of one or more software applications on the client device, the feature values include a binary value (e.g. True or False) indicating whether the user installed the one or more software applications on the client device.

The training set extractor 220 identifies a training set of the overall data set that is representative of the data that the online system 120 classifies. More specifically, the training set extractor 220 identifies, for each interest to be assessed, users of the online system 120 for whom the desired labels (i.e. the interests) are already known. For example, for the "music" interest, the training set extractor 220 extracts a positive training set comprising a set of users for whom the interest is known to be music (e.g., users who have accounts and are logged into the online system 120, and form whose profiles the user's interest is known). In another example, for a "football" interest, the training set extractor 220 identifies a positive training set comprising users known to be interested in football.

In some embodiments, the training set extractor 220 compares the training set with data from a third party data tracking system (e.g. Nielsen data) to verify that the training set is accurate. For example, the training set extractor 220 confirms that the user correctly reported the interests in the user profile by comparing the user profile data with the data stored by the third party tracking system. The training set extractor 220 filters out data with low confidence from the training set to increase the accuracy of the training set.

The trainer 230 derives a classifier 235 for each interest for which the training set extractor 220 identified a training set. The interest predictor 102 uses the classifier 235 to apply a label to a user from the unresolved group of users. The trainer 230 trains the classifier based on information about the known users of the online system 120, as extracted by the feature extractor 210.

The trainer 230 provides the extracted features from the feature extractor 210 as an input to a training algorithm. The trainer 230 may be based on one or more training algorithms including, but not restricted to, regression algorithms, instance-based algorithms, regularization algorithms, decision tree algorithms, Bayesian algorithms, clustering algorithms, dimensionality reduction algorithms, or any combination thereof. In one example, the trainer 230 uses a linear Support Vector Machine (SVM) algorithm. In some embodiments, the trainer 230 selects the training algorithm based on the size of the training set.

The trainer 230 trains the classifier 235 generated from the training set formed by the training set extractor 220. The classifier 235, when applied to features corresponding to a user (or a client device 110 of the user) outputs a prediction of value for at least one of the interests of the unresolved user. For example, a classifier 235 corresponding to the interest "football" outputs an indication of whether, or with what probability, a given unresolved user is interested in football. For instance, in one embodiment the indication is expressed as a real number (e.g., from 0.0 (not at all a likely interest) to 1.0 (almost certainly an interest)).

The content distributor 245 selects content to provide to the user based on the prediction of interest by the classifier 235. For example, the content distributor 245 selects a particular shared content item to provide to the user when the classifier 235 outputs a predicted interests that matches with the audience targeted by the provider of such shared content item (e.g., predicting that the user is interested in football, where the provider of the shared content item specified that the appropriate audience includes users that like football). That is, the online system 120 uses the classifier 235 generated by the trainer 230 to infer interest information for the users from the unresolved group. In some embodiments, the content distributor 245 uses the inferred interests information to target the audience for the shared content by providing the shared content that matches the inferred attributes. For example, if the interests predictor 102 inferred that a particular unresolved user is interested in music, the content distributor 245 could use that inference to determine that it should provide content that music lovers would tend to like.

Different types of content may be provided by the content distributor 245 in different embodiments. In one embodiment, the content is an advertisement appropriate for the inferred attributes. In other embodiments, the content is a news story.

In embodiments using averaged feature sets for inferring user interests, the feature store 250 stores, for each of various possible interests, an averaged feature set. In one such embodiment, a training set of users is identified for each of the interests by identifying users of the online system 120 known to have the interest in question, and for each user in the training set, a feature vector is extracted. Each feature vector indicates whether the user has installed various applications (e.g., on the client device 110 of the user), with each element of the feature vector corresponding to a distinct application. The feature vectors for the users in the training set are then averaged to generate an averaged feature vector corresponding to the interest that the training set represents. For example, a binary '1' or '0' value could be used to represent whether the user has installed a given application. Thus, if 500 users of a training set of 10,000 users are known to have installed a first application, the element for that first application in the averaged feature vector could be represented as 0.05 (i.e., 5% of the users of the training set for the interest in question). The interests predictor 102 can then infer the interests of an unresolved user whose interests are not known by determining a measure of similarity between the averaged feature sets for the various possibility interests and a feature vector for the user. The feature set for the user is determined in the same manner as for the users in the training set. For example, if the averaged feature set is an averaged feature vector representing whether the users have installed various applications, then the feature vector for the unresolved user indicates whether the unresolved user has installed those same applications on the unresolved user's client device. In one embodiment, the measure of similarity is computed as a dot product of the averaged feature vector and the feature vector of the unresolved user, and the measure of similarity is compared to a threshold similarity measure to determine whether or not the unresolved user is likely to have the interest in question. In one embodiment, the threshold similarity measure is computed by comparing similarity measures for users in the training set with similarity measures for users not in the training set.

The content store 255 stores objects that each represents various types of content. Examples of possible content objects include an advertisement, a page post, a status update, a photograph, a video, a link, a shared content item, a gaming application achievement, a check-in event at a local business, a brand page, or any other type of content. Online system users may create objects stored by the content store 255, such as status updates, photos tagged by users to be associated with other objects in the online system 120, events, groups or applications. In some embodiments, objects are received from third-party applications or third-party applications separate from the online system 120. In one embodiment, objects in the content store 255 represent single pieces of content, or content "items." Hence, online system users are encouraged to communicate with each other by posting text and content items of various types of media to the online system 120 through various communication channels. This increases the amount of interaction of users with each other and increases the frequency with which users interact within the online system 120.

One or more content items included in the content store 255 include an advertisement and a bid amount. The content can be text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 120 if content in the content item is presented to a user, if the content in the content item receives a user interaction when presented, or if any suitable condition is satisfied when content in the content item is presented to a user. For example, the bid amount associated with a content item specifies a monetary amount that the online system 120 receives from a user who provided the content item to the online system 120 if content in the content item is displayed. In some embodiments, the expected value to the online system 120 of presenting the content from the content item may be determined by multiplying the bid amount by a probability of the content of the content item being accessed by a user.

In various embodiments, a content item includes various components capable of being identified and retrieved by the online system 120. Example components of a content item include: a title, text data, image data, audio data, video data, a landing page, a user associated with the content item, or any other suitable information. The online system 120 may retrieve one or more specific components of a content item for presentation in some embodiments. For example, the online system 120 may identify a title and an image from a content item and provide the title and the image for presentation rather than the content item in its entirety.

Various content items may include an objective identifying an interaction that a user associated with a content item desires other users to perform when presented with content included in the content item. Example objectives include:

installing an application associated with a content item, indicating a preference for a content item, sharing a content item with other users, interacting with an object associated with a content item, or performing any other suitable interaction. As content from a content item is presented to online system users, the online system 120 logs interactions between users presented with the content item or with objects associated with the content item. Additionally, the online system 120 receives compensation from a user associated with content item as online system users perform interactions with a content item that satisfy the objective included in the content item.

Additionally, a content item may include one or more targeting criteria specified by the user who provided the content item to the online system 120. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 255 includes multiple campaigns, which each include one or more content items. In various embodiments, a campaign is associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the online system 120 provides the online system 120 with various campaigns each including content items having different characteristics (e.g., associated with different content, including different types of content for presentation), and the campaigns are stored in the content store.

In a first embodiment, targeting criteria include information about user interests, such as whether the user is interested in a particular sport, in video games, in travel, in gardening, in a particular movie, and the like. In a second embodiment, targeting criteria may specify actions or types of connections between a user and another user or object of the online system 120. Targeting criteria may also specify interactions between a user and objects performed external to the online system 120, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 120, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 260 also stores information about edges, such as affinity scores for objects, interests, and other users. Affinity scores, or "affinities," may be computed by the online system 120 over time to approximate a user's interest in an object or in another user in the online system 120 based on the actions performed by the user. A user's affinity may be computed by the online system 120 over time to approximate the user's interest in an object, in a topic, or in another user in the online system 120 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 260, in one embodiment. Alternatively, each interaction between a user and a specific object is stored as a separate edge. In some embodiments, connections between users may be stored in the user profile store 205, or the user profile store 205 may access the edge store 260 to determine connections between users.

The edge store 260 also stores information about edges corresponding to online system 120 that has a unidirectional connection between the users. For example, the edge store 260 includes a first type of affinity scores for users that follow other users and a second type of affinity scores for users that are followed by a specific user. In alternate embodiments, the edge store 260 also includes a weighted affinity score that has individual weights assigned by the online system 120 corresponding to the strength of each of the unidirectional connection between its users.

The content selection module 265 selects one or more content items for communication to a client device 110 to be presented based at least in part on the predicted interests of the unresolved user. Content items eligible for presentation to the user are retrieved from the content store 255 or from another source by the content selection module 265, which selects one or more of the content items for presentation to the viewing user. In various embodiments, the content selection module 265 includes content items eligible for presentation to the user in one or more selection processes, which identify a set of content items for presentation to the user. For example, the content selection module 265 determines measures of relevance of various content items to the user based on characteristics associated with the user by the online system 120 and based on the user's affinity for different content items. Based on the measures of relevance, the content selection module 265 selects content items for presentation to the user. As an additional example, the content selection module 265 selects content items having the highest measures of relevance or having at least a threshold measure of relevance for presentation to the user. Alternatively, the content selection module 265 ranks content items based on their associated measures of relevance and selects content items having the highest positions in the ranking or having at least a threshold position in the ranking for presentation to the user.

FIG. 2 is only one example of the interests predictor 102. In other configurations, for example, the interests predictor 102 may represent one or more modules in separate online systems 120 that can communicate with each other through the network 140.

Figure 3:
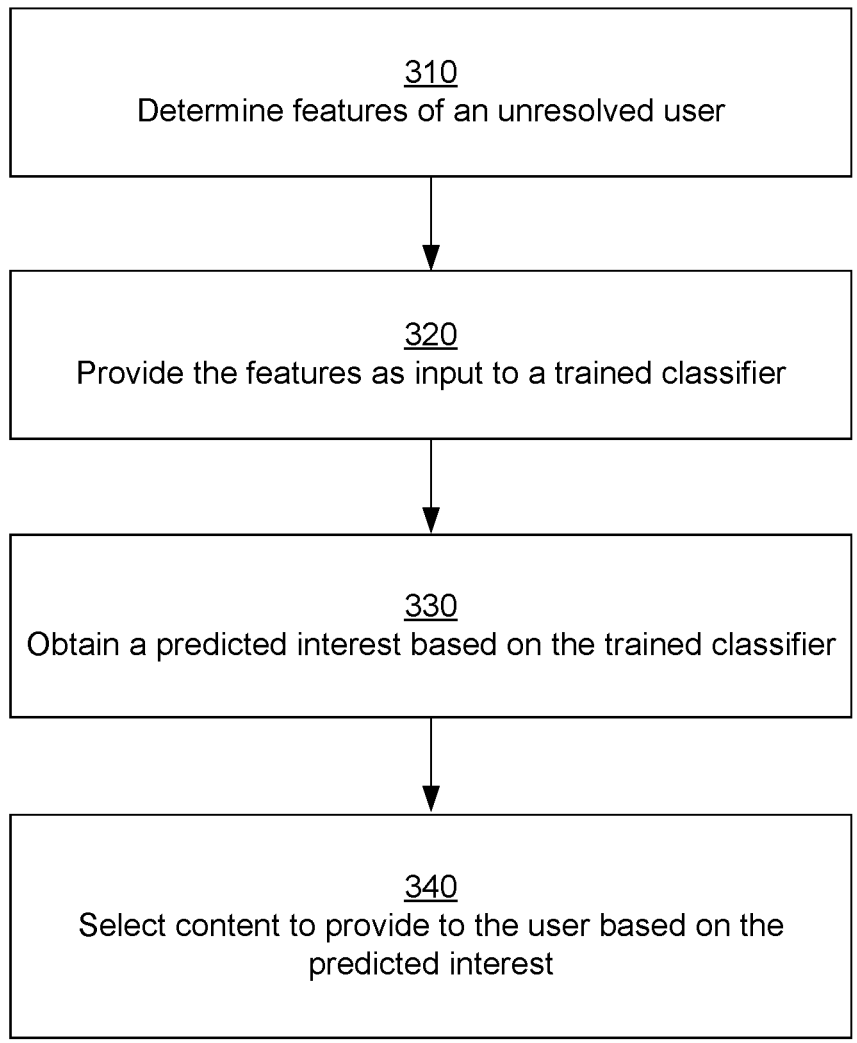
FIG. 3 is a flowchart illustrating the selection of content to provide to the user based on inferred interests, according to one embodiment.

FIG. 3 is a flowchart illustrating the selection of content to provide to the user based on inferred interests, according to one embodiment.

The online system 120 determines 310 features of users for whom a value of one or more interests are not known (e.g., because the user is an unresolved user due to lack of login). For example, the (presently unknown, to-be-determined) interests may represent an interest of the user in a particular sport, a particular type of music, film, travel, etc. The determined features (e.g. information related to the software applications that are installed on the client device, or the use of a software application that is installed) represent properties of the user (including, e.g., the user's client device 110) as extracted by the feature extractor 210 described above with reference to FIG. 2.

In an embodiment using supervised machine learning, the online system 120 provides 320 the features as input to a trained classifier 235 derived from machine learning by the trainer 230 using training algorithms such as linear Support Vector Machine (SVM), as described above with reference to FIG. 2 (the first embodiment predicting interests using device-level features). The online system 120 obtains 330 from the classifier 235 an output including a prediction of one or more interests of the unresolved user.

In an alternate embodiment based on similarity determinations between feature values, the online system 120 infer the interests of an unresolved user whose interests are not known by determining a measure of similarity between the averaged feature sets for the various possibility interests and a feature vector for the user. The online system 120 determines the feature set for the user in the same manner as for the users in the training set. The online system 120 computes a threshold similarity measure by comparing similarity measures for users in the training set with similarity measures for users not in the training set, as described above with respect to FIG. 2.

The online system 120 selects 340 content to provide to the user based on the predicted interests of the unresolved user. For example, the content distributor 245 provides an appropriate newsfeed item or other sponsored content to the unresolved user responsive to the user's predicted interests matching the target criteria based on age or gender as described above with reference to FIG. 2.

It is appreciated that although FIG. 3 illustrates a number of steps according to one embodiment, the precise steps and/or order of steps may vary in different embodiments.

Figure 4:
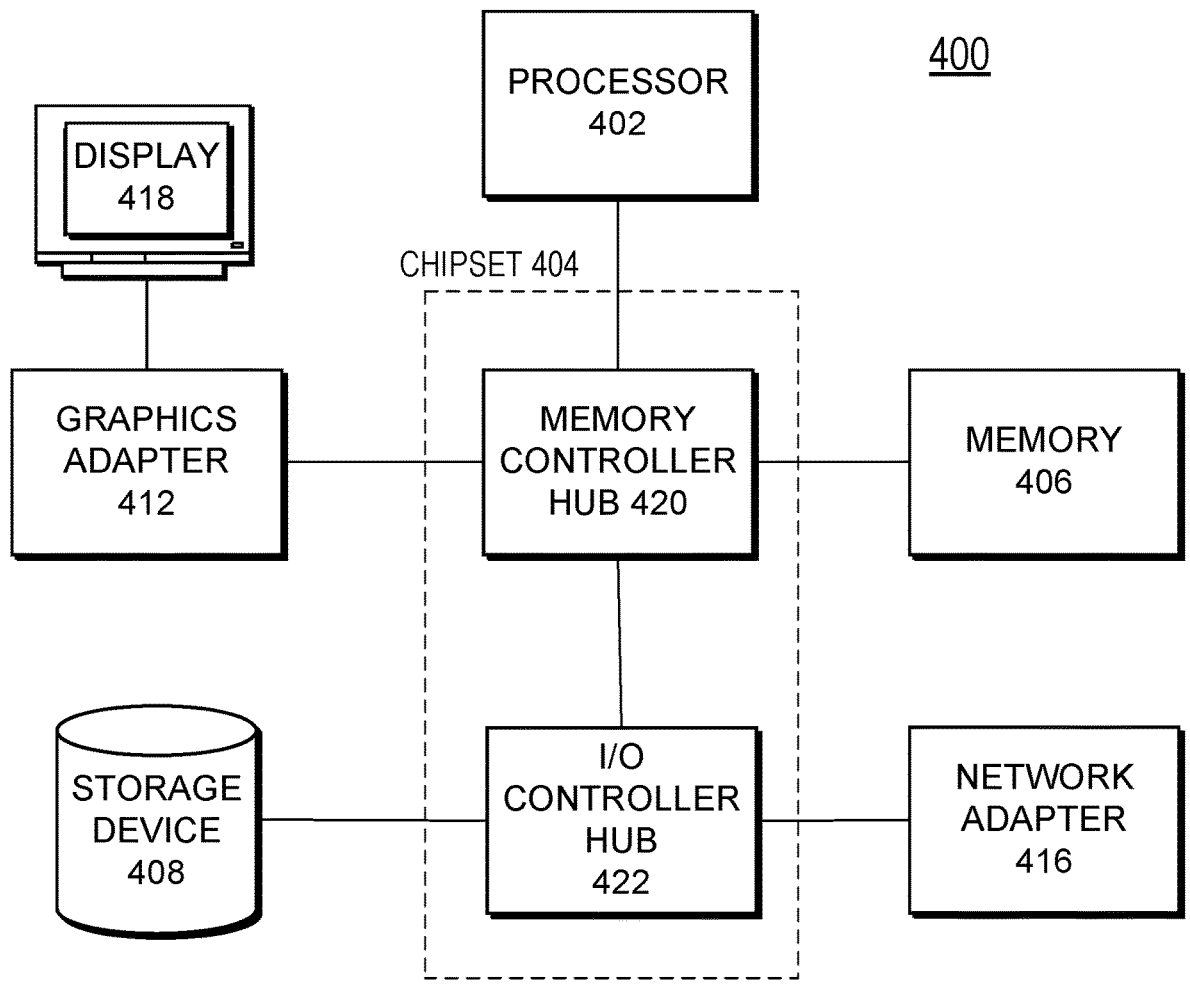
FIG. 4 is a high-level block diagram illustrating physical components of a computer used as part or all of the online system and the client devices from FIG. 1, according to one embodiment.

FIG. 4 is a high-level block diagram illustrating physical components of a computer used as part or all of the online system and the client devices from FIG. 1, according to one embodiment. Illustrated are at least one processor 402 coupled to a chipset 404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network.

As is known in the art, a computer 400 can have different and/or other components than those shown in FIG. 4. In addition, the computer 400 can lack certain illustrated components. In one embodiment, a computer 400 acting as a server may lack a graphics adapter 412, and/or display 418, as well as a keyboard or pointing device. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 5:
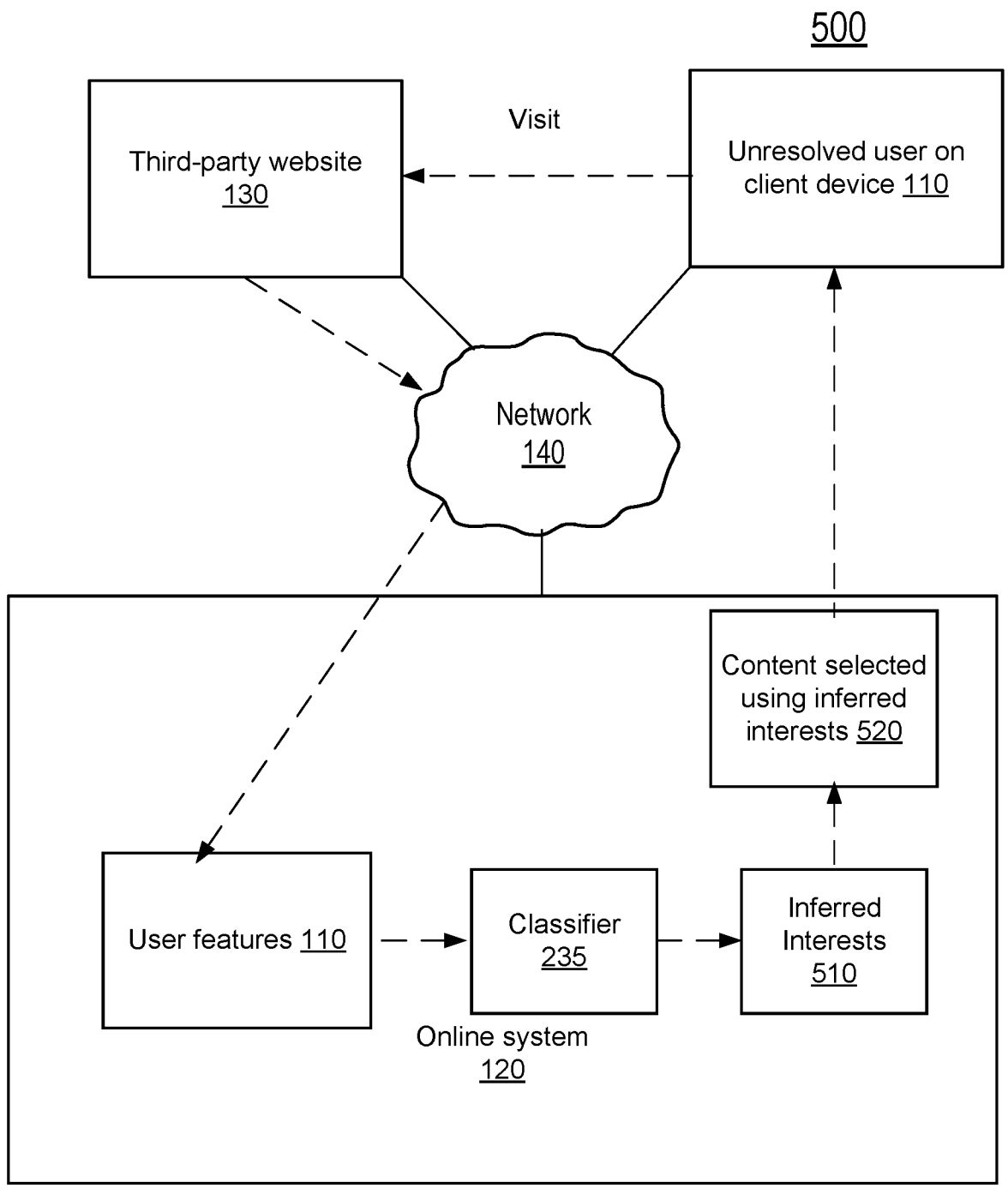
FIG. 5 is an illustration of inferring of interests of unresolved users based on the method disclosed in FIG. 3, according to one embodiment.

FIG. 5 is an illustration 500 of inferring of interests of unresolved users based on the method disclosed in FIG. 3, according to one embodiment. In the illustration 500, an unresolved user on the client device 110 visits the third-party website 130. In response to the visit by the unresolved user to the third-party website 130, the client device 110 transmits features (e.g., a feature vector of applications installed on the client device 110) from the client device 110 to the online system 120 via the network 140. As described above in conjunction with FIG. 2-4 above, the online system 120 inputs the features to the trained classifier 235. The trained classifer 235 outputs the inferred interests 510. The online system 120 provides the content selected using inferred interests 520 to the unresolved user on the client device 110.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter.

Accordingly, the disclosure of the present invention is intended to be illustrative, but not limiting, of the scope of the invention, which is set forth in the following claims.

What is claimed is:

1. A computer-implemented method performed by an online system, the method comprising:
  receiving content items from content providers for display to users of the online system, each content item associated with an audience defining interests of users to whom the content item is to be provided;
  for each interest of one or more interests:
    forming a training set of users having the interest in their user profile in the online system,
    deriving features of the users of the training set, the features indicating which applications the users have installed on client devices of the users, each feature represented by a feature value, and
    training a classifier to predict the interest for a user by providing the derived features as input to a machine learning algorithm;
  responsive to detecting an opportunity to provide one of the received content items to an unresolved user who the online system is unable to match to a user profile of the online system, applying one or more of the trained classifiers to predict one or more interests for the unresolved user by:
    deriving features of the unresolved user, the features indicating which applications the unresolved user has installed on a client device of the unresolved user, each feature represented by a feature value,
    providing the derived features as input to one of the trained classifiers, and
    obtaining, as an output from the trained classifier, a prediction of whether the unresolved user has an interest corresponding to the trained classifier, wherein obtaining the prediction comprises:
      computing averaged feature values by averaging the feature values of the users of the training set,
      computing a degree of similarity of the averaged feature values of the users of the training set and the feature values of the unresolved user by computing a dot product of the averaged feature values of the users of the training set and the feature values of the unresolved user, and
      responsive to determining that the degree of similarity is above a threshold value, predicting that the unresolved user has the interest; and
  based on the predicted interests of the unresolved user, providing for display to the unresolved user a content item having an audience that includes at least one of the predicted interests for the unresolved user.

2. A computer-implemented method performed by an online system, the computer-implemented method comprising:
  training a classifier using a training set of users having an interest known by the online system, the training set comprising feature values for a first set of features for the users of the training set and the classifier configured to predict an interest of an unresolved user of the online system for whom the online system does not have information about;
  for the unresolved user, determining feature values for the first set of features for the unresolved user;
  obtaining, as an output of the trained classifier applied to the feature values for the unresolved user, a prediction of whether the unresolved user has the first interest, wherein obtaining the prediction comprises:

computing averaged feature values by averaging feature values for the users of the training set, computing a degree of similarity of the averaged feature values for the users of the training set and the feature values for the unresolved user by computing a dot product of the averaged feature values of the users of the training set and the feature values of the unresolved user, and responsive to determining that the degree of similarity is above a threshold value, predicting that the unresolved user has the interest; and selecting content to provide to the unresolved user based on the prediction.

3. The computer-implemented method of claim 2, wherein the classifier is trained using machine learning.

4. The computer-implemented method of claim 2, further comprising training the classifier by:

identifying, for each user of the training set of users, the first interest in a profile of the user on the online system;

training the classifier by providing the feature values for the users of the training set as input to a supervised machine learning algorithm.

5. The computer-implemented method of claim 2, wherein the features comprise indications of software applications that are installed on a client device of the unresolved user.

6. The computer-implemented method of claim 2, wherein the features comprise times of usage of software applications installed on a client device of the unresolved user.

7. The computer-implemented method of claim 2, wherein the features comprise types of gaming applications installed on a client device of the unresolved user.

8. The computer-implemented method of claim 2, wherein the first interest comprises at least one of an interest in a sport and an interest in a film.

9. A non-transitory computer-readable storage medium having instructions that when executed by a processor of an online system perform actions comprising:

training a classifier using a training set of users having an interest known by the online system, the training set comprising feature values for a first set of features for the users of the training set and the classifier configured to predict an interest of an unresolved user of the online system for whom the online system does not have information about;

for the unresolved user, determining feature values for the first set of features for the unresolved user;

obtaining, as an output of the trained classifier applied to the feature values for the unresolved user, a prediction of whether the unresolved user has the first interest, wherein obtaining the prediction comprises:

computing averaged feature values by averaging feature values for the users of the training set, computing a degree of similarity of the averaged feature values for the users of the training set and the feature values for the unresolved user by computing a dot product of the averaged feature values of the users of the training set and the feature values of the unresolved user, and responsive to determining that the degree of similarity is above a threshold value, predicting that the unresolved user has the interest; and selecting content to provide to the unresolved user based on the prediction.

10. The non-transitory computer-readable storage medium of claim 9, wherein the classifier is trained using machine learning.

11. The non-transitory computer-readable storage medium of claim 9, the actions further comprising training the classifier by:

identifying, for each user of the training set of users, the first interest in a profile of the user on the online system;

training the classifier by providing the feature values for the users of the training set as input to a supervised machine learning algorithm.

12. The non-transitory computer-readable storage medium of claim 9, wherein the features comprise indications of software applications that are installed on a client device of the unresolved user.

13. The non-transitory computer-readable storage medium of claim 9, wherein the features comprise times of usage of software applications installed on a client device of the unresolved user.

14. The non-transitory computer-readable storage medium of claim 9, wherein the features comprise types of gaming applications installed on a client device of the unresolved user.

15. The non-transitory computer-readable storage medium of claim 9, wherein the first interest comprises at least one of an interest in a sport and an interest in a film.

* * * * *